Oct. 22, 1963  E. P. McGINN  3,107,519
DEFOAMING TESTER
Filed April 28, 1960
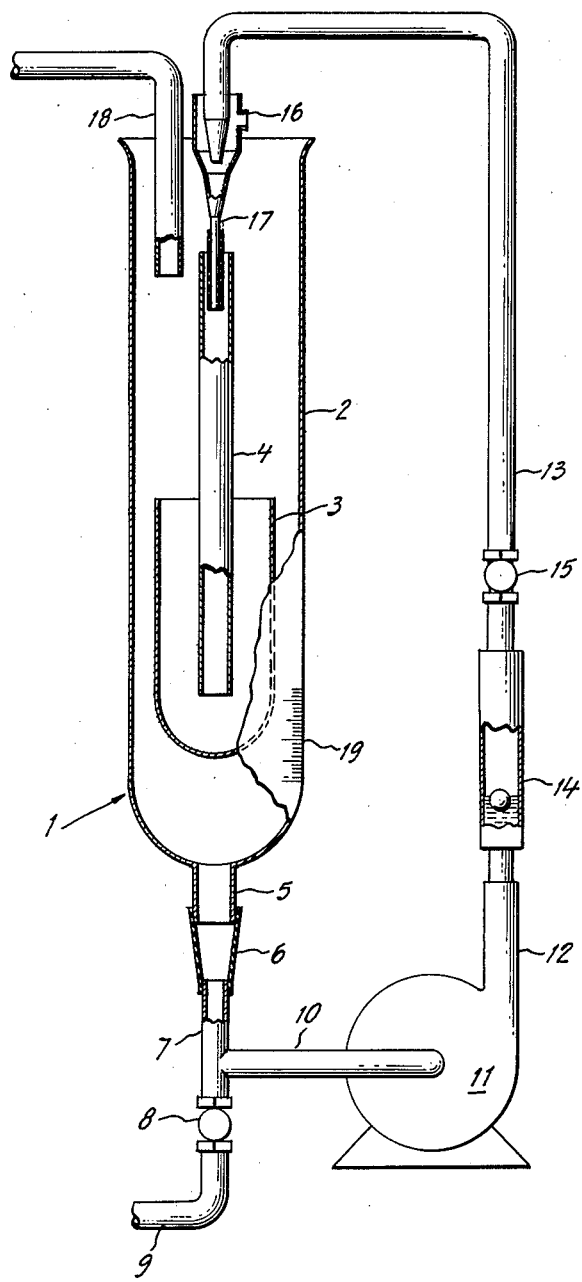
INVENTOR.
EARL P. McGINN
BY
Bierman + Bierman
ATTORNEY

United States Patent Office 3,107,519
Patented Oct. 22, 1963

3,107,519
DEFOAMING TESTER
Earl P. McGinn, Verona, N.J., assignor to Drew Chemical Corporation, a corporation of Delaware
Filed Apr. 28, 1960, Ser. No. 25,398
7 Claims. (Cl. 73—53)

This invention relates to a method and apparatus for testing the foaming characteristics of various liquids. More specifically it is directed to the determination of the effectiveness of various defoaming agents when used in connection with various liquids.

In many industries and in many applications, the problem of excessive foaming by various liquids is one which requires solution. Various defoaming agents have been discovered and are being used for this purpose.

However, there is no apparatus or method for accurately and reproducibly testing the effectiveness of a given defoaming agent in a given solution known to the art.

It is therefore among the objects of this invention to provide an apparatus which is capable of accurately measuring the effectiveness of defoaming agents in respect to various liquids.

It is also among the objects of this invention to provide apparatus for testing the effectiveness of defoaming agents, which will also measure the time of suppression of foam.

It is further among the objects of this invention to provide apparatus which is simple in construction and easy to operate.

It is still further among the objects of this invention to provide a method of testing the effectiveness of defoaming agents which will yield accurate and reproducible results, with a minimum of skill required on the part of the operator.

In practicing this invention, there is provided a measuring cylinder open at the top and having a discharge at the bottom. A foam cup shorter and of smaller diameter than the cylinder is located within said cylinder. A comparatively long slender tube extending into said cup is connected to the outlet of a pump in the system.

The discharge from the measuring cylinder is connected to the inlet of the pump whereby circulation is achieved from the pump into the tube over the lip of the foam cup and back into the discharge of the measuring cylinder.

For some liquids which do not foam too readily, the addition of an aspirator in the line just above the entrance to the tube is often found desirable. It is also advisable to so proportion the dimensions of the tube and aspirator outlet that the aspirator outlet is of smaller diameter than the entrance to the tube.

In operation, the liquid is caused to foam (either naturally or with the assistance of the aspirator) as it passes through the tube. This foam then bubbles up over the lip of the foam cup and builds up in the measuring cylinder.

The measuring cylinder is provided with a graduated scale for purpose of knowing the height of the foam. When the foam has reached a stable level, a measured quantity of the defoaming agent to be tested is dropped into the measuring cylinder. The initial fall in the foam level is noted as well as the lowest drop in the foam level. At the same time, the number of seconds required to obtain the initial drop are measured, as well as the total length of time that the foam is suppressed. In other words, when the foam rebuilds to a predetermined level (generally the level of the lip of the foam cup), it is considered that foam suppression has terminated.

Thus the best defoaming agent will have the longest suppression time, fastest initial drop and lowest initial and final drop levels.

Among the numerous advantages of this device is the fact that it measures "live" foam only and not scum or "dead" foam. This is due to the fact that foam is constantly being generated and is constantly breaking down so that a dynamic rather than static balance is achieved in reading any of the foam levels.

In the accompanying drawings constituting a part hereof and in which like reference characters indicate like parts, the single FIGURE is a schematic diagram of the entire apparatus partly in section.

The apparatus 1 is composed of a measuring cylinder 2 preferably having a flaring open upper end and a discharge 5 at or near the bottom thereof. Foam cup 3 is secured within cylinder 2 and is generally shorter than cylinder 2 as well as being of smaller diameter.

Tube 4 extending into cup 3 is preferably open at both ends. Discharge 5 through rubber tubing 6 is connected to pipe 7. Inlet 10 of pump 11 is joined to pipe 7 above valve 8. Valve 8 is used when cleaning the apparatus to permit fluid to flow down drain 9.

Outlet 12 of pump 11 is joined to connection 13 which carries control valve 15 and preferably flow meter 14. Control valve 15 is used to adjust the rate of flow of pump 11 so that readings within the range of the device are obtained.

Aspirator 16 is placed at the end of connection 13 adjacent tube 4 and carries a restricted outlet 17 which discharges into tube 4. Rinse pipe 18 is connected to a source of fresh water for cleaning and rinsing purposes.

In operation, a measured quantity of the liquid to be tested is poured into cylinder 2. Pump 11 is started up and valve 15 is adjusted so that the amount of foam built up reaches a stable level within cylinder 2 and preferably at the lip of foam cup 3. The flow is noted from the reading on flow meter 14. If it is not possible to obtain sufficient foaming in the liquid, aspirator 16 is used. With the aspirator it is possible to obtain suitable degrees of foam even with plain water.

After the foam level of the liquid is stabilized, its level is noted and a measured amount of the defoaming agent to be tested is pipetted into measuring cylinder 2. This results in an immediate initial drop in foam level and is often followed by a subsequent further drop shortly after the initial change. Both of these levels are read on scale 19 and the time required for the initial drop recorded. The apparatus is continued in operation until the effectiveness of the defoaming agent is destroyed and the foam builds up again to predetermined level, usually the level of the lip of foam cup 3. The time necessary for the build-up is noted and is a factor in evaluating the effectiveness of the defoaming agent.

In a modification of the above tester, a universal motor is used to drive the pump, the speed of which may then be controlled by means of a rheostat. Thus the pump speed, instead of a control valve, is used to regulate the rate of flow of the liquid. An ammeter in the circuit indicates the amount of power being used and thus indirectly the rate of flow.

While only one specific embodiment of this invention has been described, changes which would be obvious to one skilled in the art may be made without departing from the scope or spirit thereof and this invention is to be broadly construed and not to be limited except by the character of the claims appended hereto.

What is claimed is:

1. Apparatus for testing defoaming agents comprising a measuring cylinder open at the top and having a discharge at the bottom thereof, a foam cup shorter and of smaller diameter than said cylinder and located therein and terminating short of both top and bottom of said cylinder, a comparatively long slender tube extending from the top of said cylinder into said cup, said discharge being connected to the inlet of a pump, a connection between said tube and the outlet of said pump, whereby circulation of a liquid downward through said cup and overflowing into said cylinder and through said discharge is achieved.

2. Apparatus according to claim 1 wherein an aspirator is between said pump and said tube.

3. Apparatus according to claim 1 wherein said connection discharges into said tube through a nozzle of smaller diameter than said tube.

4. Apparatus according to claim 1 wherein there is a flow meter through which said circulation passes.

5. Apparatus according to claim 1 wherein there is provided a rinse pipe extending into the top of said cylinder and a drain.

6. A method of testing defoaming agents comprising placing a measured amount of liquid in a measuring cylinder open at the top and having a discharge at the bottom thereof and a foam cup shorter and of smaller diameter than said cylinder and located therein, a comparatively long, slender tube extending into said cup, said discharge being connected to the inlet of a pump and a connection between said tube and the outlet of said pump, circulating said liquid through the tube into the foam cup, over the lip of said cup and through the discharge and pump back to said tube, allowing the foam level in said cylinder to stabilize, adding a measured amount of defoaming agent, continuing said circulation until said level drops and rebuilds to a predetermined height.

7. A method according to claim 6 wherein said liquid is passed through an aspirator.

References Cited in the file of this patent

UNITED STATES PATENTS

| | | |
|---|---|---|
| 1,866,296 | Christmann | July 5, 1932 |
| 2,043,599 | Waldschmidt | June 9, 1936 |
| 2,315,983 | Ross et al. | Apr. 6, 1943 |

FOREIGN PATENTS

| | | |
|---|---|---|
| 735,795 | Germany | May 26, 1943 |
| 1,154,078 | France | Oct. 28, 1957 |